(12) United States Patent
Tsutsuyama

(10) Patent No.: US 12,447,542 B2
(45) Date of Patent: Oct. 21, 2025

(54) METHOD FOR CHAMFERING TOOTHED GEAR

(71) Applicant: OSG CORPORATION, Toyokawa (JP)

(72) Inventor: Koji Tsutsuyama, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 654 days.

(21) Appl. No.: 17/796,891

(22) PCT Filed: Apr. 3, 2020

(86) PCT No.: PCT/JP2020/015262
§ 371 (c)(1),
(2) Date: Aug. 2, 2022

(87) PCT Pub. No.: WO2021/199417
PCT Pub. Date: Oct. 7, 2021

(65) Prior Publication Data
US 2023/0055299 A1 Feb. 23, 2023

(51) Int. Cl.
*B23F 19/10* (2006.01)
*B23F 21/12* (2006.01)

(52) U.S. Cl.
CPC .......... *B23F 19/105* (2013.01); *B23F 19/102* (2013.01); *B23F 21/12* (2013.01); *Y10T 409/101113* (2015.01)

(58) Field of Classification Search
CPC ............. B23F 19/10–107; B23F 19/00; Y10T 409/101113–101272

(Continued)

(56) References Cited

U.S. PATENT DOCUMENTS 5,174,699 A * 12/1992 Faulstich .............. B23F 19/002
409/26
11,338,379 B2 * 5/2022 Sobczyk ............... B23F 17/006
(Continued)

FOREIGN PATENT DOCUMENTS

CN 116475504 A * 7/2023
CN 118123138 A * 6/2024
(Continued)

OTHER PUBLICATIONS

Office Action dated Feb. 7, 2024, issued in counterpart CN Application No. 202080032630.0, with English translation. (9 pages).
(Continued)

*Primary Examiner* — Erica E Cadugan
(74) *Attorney, Agent, or Firm* — WHDA, LLP

(57) ABSTRACT

A method for chamfering toothed gears which enables lengthening of a life of a tool is provided. The chamfering method is for sequentially chamfering the line intersection portions 23 between tooth flanks 21 and end faces 22 of teeth 2 with end cutting edges 122. A pitch Pb of the end cutting edges 122 is set to five times a pitch Pa of the teeth 2. As a result, at a chamfering step of chamfering line intersection portions 23 of the teeth 2, a circumferential speed of the end cutting edges 122 can be made faster than a circumferential speed of the teeth 2. Consequently, a difference in circumferential speed between the end cutting edges 122 and the teeth 2 can be utilized in chamfering and thus a cutting resistance can be reduced during the chamfering. Therefore, a life of the tool 100 can be lengthened.

14 Claims, 9 Drawing Sheets

(58) Field of Classification Search
USPC .......................................................... 409/8–9
See application file for complete search history.

(56) References Cited

U.S. PATENT DOCUMENTS

| | | | |
|---|---|---|---|
| 2012/0148360 A1 | 6/2012 | Heinemann et al. | |
| 2015/0360307 A1 | 12/2015 | Vogel | |
| 2024/0335893 A1* | 10/2024 | Bogaerts | B23F 19/10 |

FOREIGN PATENT DOCUMENTS

| | | | |
|---|---|---|---|
| DE | 102005054237 A1 | 5/2007 | |
| EP | 2954967 A1 | 12/2015 | |
| JP | 2016-453 A | 1/2016 | |
| JP | 2016-132048 A | 7/2016 | |
| WO | WO-2020/212903 A1 * | 10/2020 | |

OTHER PUBLICATIONS

International Search Report dated Jun. 30, 2020, issued in counterpart International Application No. PCT/JP2020/015262 (2 pages).
English Translation of International Preliminary Report on Patentability from PCT/IPEA/409 dated Aug. 22, 2022, issued in counterpart application No. PCT/JP2020/015262. (3 pages).
Office Action dated May 31, 2023, issued in counterpart KR Application No. 10-2021-7027432, with English translation. (9 pages).
Extended (Supplementary) Search Report dated May 30, 2023, issued in counterpart EP Application No. 20928051.0. (8 pages).

\* cited by examiner

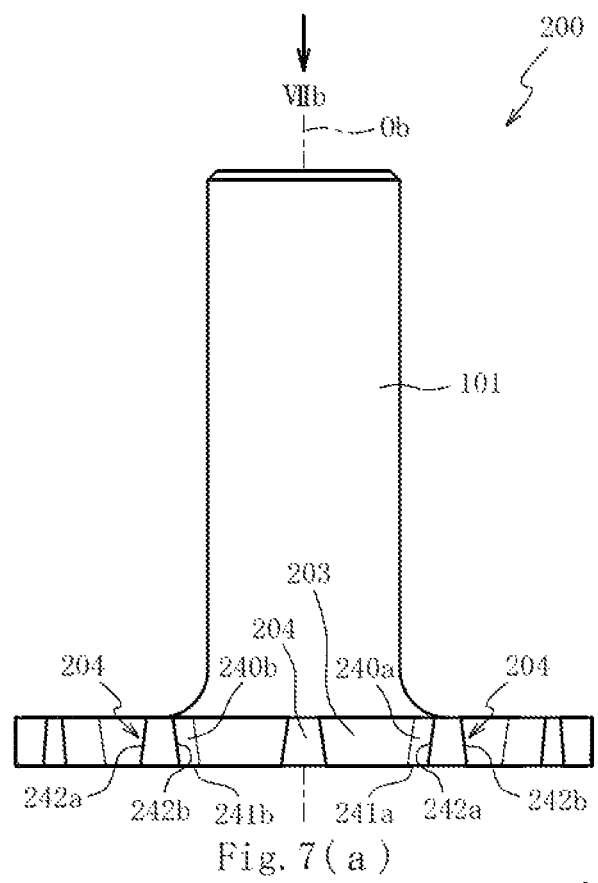
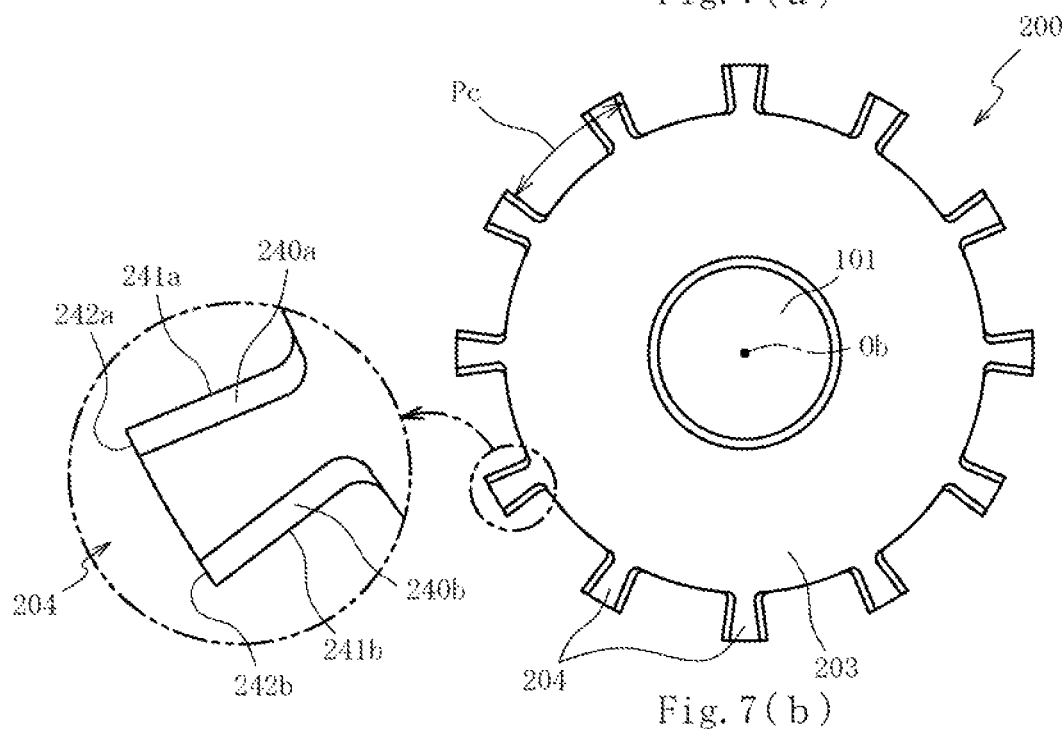
Fig. 7(a)
Fig. 7(b)

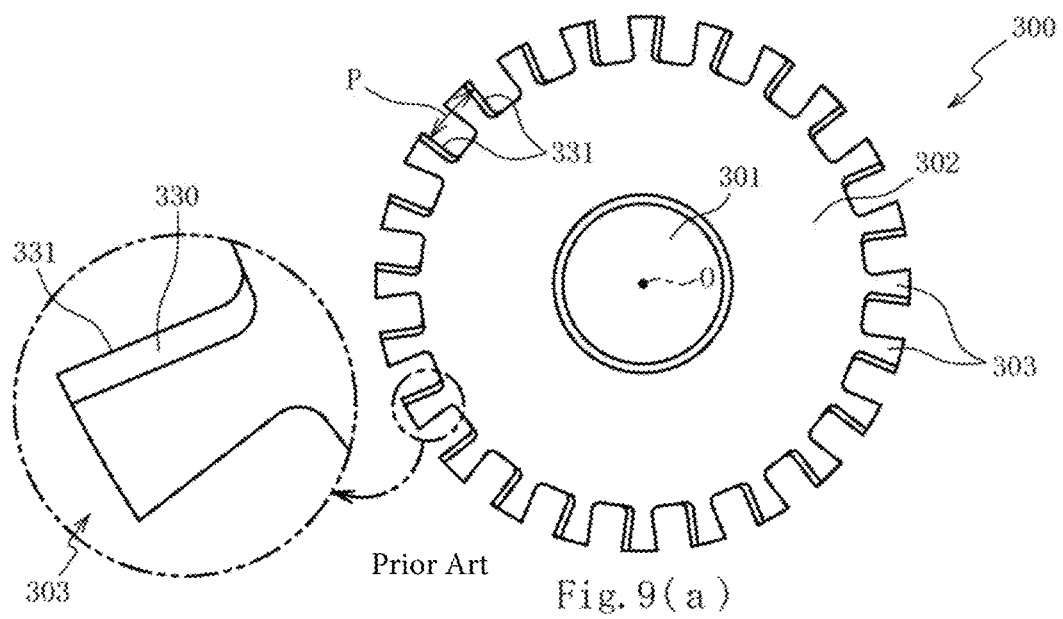
Prior Art Fig. 9(a)
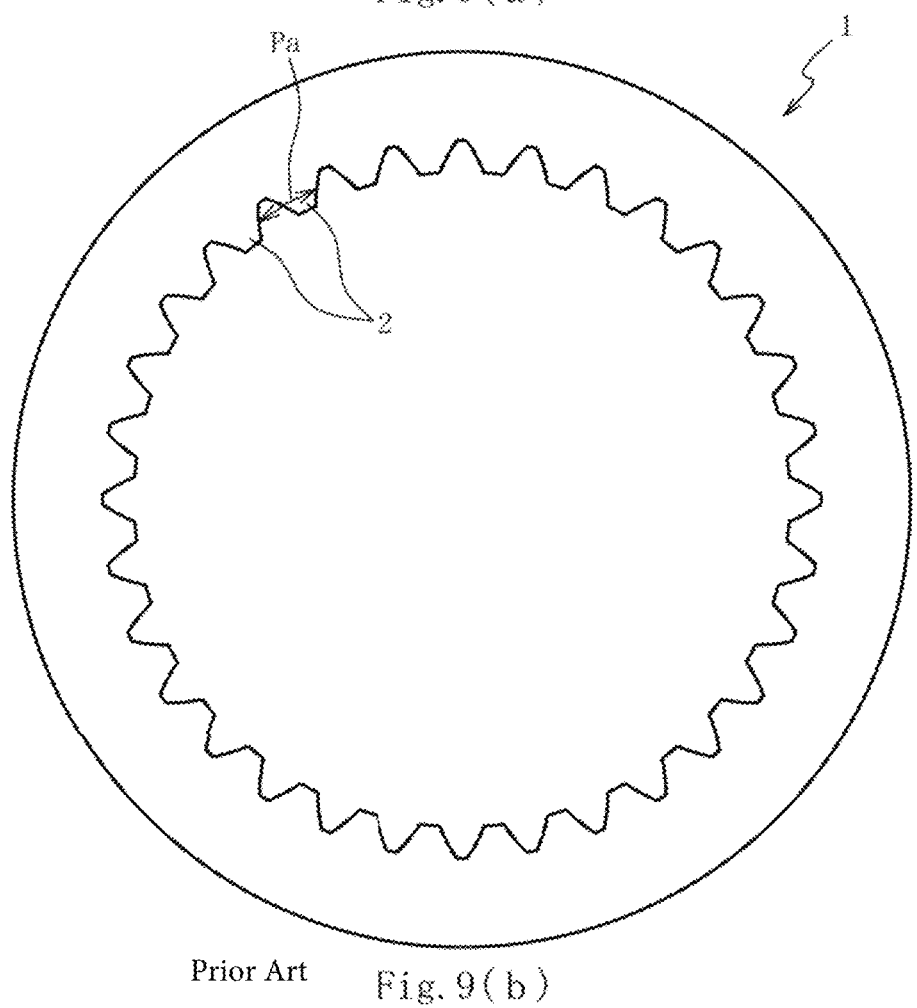
Prior Art Fig. 9(b)

METHOD FOR CHAMFERING TOOTHED GEAR

TECHNICAL FIELD

The present invention relates to methods for chamfering toothed gears and in particular to a method for chamfering toothed gears that enables lengthening of a life of a tool.

BACKGROUND ART

Patent Publication 1 describes a technology for chamfering a line intersection portion between a tooth flank of a tooth of a toothed gear and an end face (side face) of the tooth in a tooth trace direction by an end cutting edge of a tool. As in this technology, a line intersection portion between a tooth flank and an end face of a tooth can be chamfered with an end cutting edge by inclining the axis of a tool from the axis of a toothed gear and rotating the toothed gear and the tool so that a tooth of the toothed gear and an end cutting edge of the tool are sequentially engaged with each other.

PATENT LITERATURE

[Patent Literature 1] Japanese Unexamined Patent Application Publication No. 2016-000453 (Paragraphs 0036 to 0044, FIGS. 2 to 3D, for example)

SUMMARY OF INVENTION

Technical Problem

A description will be given to a conventional tool for performing such chamfering work as described above with reference to FIGS. 9(a) and 9(b). FIG. 9(a) is a top view of a conventional tool 300 and FIG. 9(b) is a top view (side view) of a toothed gear 1.

As shown in FIGS. 9(a) and 9(b), the conventional tool 300 includes: a columnar shank 301 having an axis O at the center of the shank; a disk-shaped disk portion 302 formed at an end portion of the shank 301 in the axis O direction (end portion on the back side in the vertical direction of the page of FIG. 9(a)); and a cutting part 303 formed in the circumferential surface of the disk portion 302.

A plurality (24 in the example in FIG. 9(a)) of the cutting part 303 are arranged at equal intervals around the axis O of the tool 300. Each of the cutting parts 303 is so formed as to protrude outward in the radial direction of the tool 300 and a cutting face 330 is formed in the surface of the cutting part 303 on the forward side of the direction of rotation of the cutting part (clockwise direction).

An end cutting edge 331 is formed at the line intersection portion between a cutting face 330 and the end flank of a cutting part 303. A pitch P of the end cutting edges 331 is so set as to be identical with a pitch Pa of the teeth 2 of the toothed gear 1.

For this reason, to sequentially chamfer a plurality of teeth 2 by end cutting edges 331, a circumferential speed of the end cutting edges 331 must be so set as to be identical with a circumferential speed of the teeth 2. In conventional tools 300, a circumferential speed of the end cutting edges 331 cannot be made faster than a circumferential speed of the teeth 2; therefore, a cutting resistance is difficult to reduce in chamfering and thus a problem of a life of a tool 300 being prone to be shortened arises.

The present invention is made to solve the above problem and it is an object of the present invention to provide a method for chamfering toothed gears that allows a life of a tool to be lengthened.

Solution to Problem

To achieve the above object, a method for chamfering toothed gears of the present invention includes: a toothed gear formation step of forming a plurality of teeth around the axis of a toothed gear; and a chamfering step of sequentially chamfering the teeth formed as the result of the toothed gear formation step with a tool. The tool includes a plurality of end cutting edges formed at an end portion of the tool in the axial direction and formed around the axis of the tool. With respect to the method for chamfering toothed gears, at the chamfering step, the axis of the tool is inclined from the axis of the toothed gear and the toothed gear and the tool are rotated. The line intersection portions between tooth flanks positioned on the forward side of the direction of rotation of the toothed gear among the tooth flanks of the teeth and the end faces of the teeth in the tooth trace direction are sequentially chamfered with the end cutting edges by the above rotation. A pitch of the end cutting edges is set to be M times a pitch of the teeth. At the chamfering step, a circumferential speed of the end cutting edges is made faster than a circumferential speed of the teeth when the line intersection portions are chamfered; the teeth are chamfered every N teeth; and values of M and N satisfy a relation of M>1, and a relation of M−1>N≥1.

Advantageous Effects of Invention

According to the method for chamfering toothed gears described in aspect 1, a pitch of a plurality of end cutting edges is set to M times a pitch of a plurality of teeth and a value of M satisfies a value of M>1. Therefore, at the chamfering step of chamfering the line intersection portion between a tooth flank and an end face of a tooth, a circumferential speed of the end cutting edges can be made faster than a circumferential speed of the teeth.

Further, according to the method for chamfering toothed gears described in aspect 1, at the chamfering step, a plurality of teeth are chamfered every N teeth and a value of N satisfies N≥1. Therefore, a degree of freedom in tool designing is enhanced A more specific description will be given. A circumferential speed of end cutting edges (pitch of end cutting edge) is adjustable according to a diameter of the tool or a number of end cutting edges. On the other hand, for example, a diameter of a tool may be restricted by a chamfering shape (length of a line intersection portion and the like). In this case, when adjoining teeth are to be continuously chamfered, a circumferential speed of end cutting edges need be adjusted according to a number of the end cutting edges and this leads to degradation in degree of freedom in tool designing.

According to aspect 1, meanwhile, a plurality of teeth are chamfered every N teeth and a value of N satisfies N≥1. Therefore, a circumferential speed of the end cutting edges (pitch of the end cutting edges) can be adjusted by varying a value of N. As a result, when a circumferential speed of the end cutting edges is adjusted, a number of the end cutting edges can be suppressed from being restricted and thus an effect of enhancement of degree of freedom in tool designing is brought about.

For example, when a pitch of end cutting edges is twice a pitch of teeth and a plurality of teeth is to be chamfered every other tooth, that is, when a relation of "M−1=N" is satisfied, a circumferential speed of end cutting edges and a circumferential speed of the teeth agree with each other. According to aspect 1, meanwhile, a value of N is set so that a relation of "M−1>N" is satisfied; therefore, a circumferential speed of the end cutting edges can be made faster than a circumferential speed of the teeth. Consequently, an effect that a life of a tool can be lengthened is brought about.

According to the method for chamfering toothed gears described in aspect 2, in addition to the effect brought about by the method for chamfering toothed gears described in aspect 1, the following effect is brought about. When it is assumed that a total number of a plurality of teeth is Na, a value of N+1 and Na are prime numbers each other. Therefore, a state in which all the teeth are chamfered is obtained by rotating the toothed gear and the tool by a predetermined number of times and sequentially chamfering the line intersection portions of the teeth.

According to the method for chamfering toothed gears described in aspect 3, in addition to the effect brought about by the method for chamfering toothed gears described in aspect 1, the following effect is brought about. When it is assumed that a total number of a plurality of teeth is Na, a value of N+1 and Na have two or more common divisors. Therefore, a state in which only some of the teeth are chamfered is obtained by rotating the toothed gears and the tool by a predetermined number of times and sequentially chamfering the line intersection portions of the teeth. That is, only desired ones of a plurality of teeth can be chamfered.

According to the method for chamfering toothed gears described in aspect 4, in addition to the effect brought about by the method for chamfering toothed gears described in aspect 3, the following effect is brought about. Sine a value of N+1 is a divisor of Na, a state in which a plurality of teeth are chamfered every N teeth is obtained by rotating the toothed gear and the tool by a predetermined number of times and sequentially chamfering the line intersection portions of the teeth.

According to the method for chamfering toothed gears described in aspect 5, in addition to the effect brought about by the method for chamfering toothed gears described in any of aspects 1 to 4, the following effect is brought about. At the chamfering step, a circumferential speed of the end cutting edges is made equal to M/(N+1) times a circumferential speed of the teeth when the line intersection portions are chamfered. Therefore, a circumferential speed of the end cutting edges can be made faster than a circumferential speed of the teeth and further the teeth can be chamfered every N teeth (N≥1).

According to the method for chamfering toothed gears described in aspect 6, in addition to the effect brought about by the method for chamfering toothed gears described in any of aspects 1 to 5, the following effect is brought about. A tool includes: a first end cutting edge formed in a first cutting face facing to one side in the direction of rotation of the tool; and a second end cutting edge formed in a second cutting face facing to the other side in the direction of rotation of the tool. Thus, the line intersection portions between tooth flanks facing to one side in the direction of rotation of the toothed gear and the end faces of teeth are chamfered with the first end cutting edges and then the rotations of the toothed gear and the tool are reversed. As a result, the line intersection portions between tooth flanks facing to the other side in the direction of rotation of the toothed gear and the end faces of teeth can be chamfered with the second end cutting edges. That is, when each of a pair of line intersection portions formed on both sides of a tooth in the direction of rotation of the toothed gear is chamfered, the tool need not be changed and thus a machining time can be shortened.

According to the method for chamfering toothed gears described in aspect 7, in addition to the effect brought about by the method for chamfering toothed gears described in aspect 6, the following effect is brought about. A tool includes cutting parts where a first end cutting edge and a second end cutting edge are formed and the cutting parts are symmetrically formed with respect to a plane along the axis of the tool. Therefore, a load applied to cutting parts can be made even between when chamfering is performed with the first end cutting edge and when chamfering is performed with the second end cutting edge. Consequently, setting of the strength of a cutting part is facilitated.

BRIEF DESCRIPTION OF DRAWINGS

FIG. 7(a) is a front view of a tool used in a chamfering method in a second embodiment and FIG. 7(b) is a top view of the tool in FIG. 7(a) as viewed from the direction of arrow VIIb;

FIG. 9(a) is a top view of a conventional tool and FIG. 9(b) is a top view of a toothed gear.

DESCRIPTION OF EMBODIMENTS

Hereafter, a description will be given to preferred embodiments of the present invention with reference to the accompanying drawings. First, a description will be given to configurations of a toothed gear 1 to which a chamfering method of the present invention is applied and a tool 100 chamfering that toothed gear 1 with reference to FIGS. 1 to 3.

Figure 1:
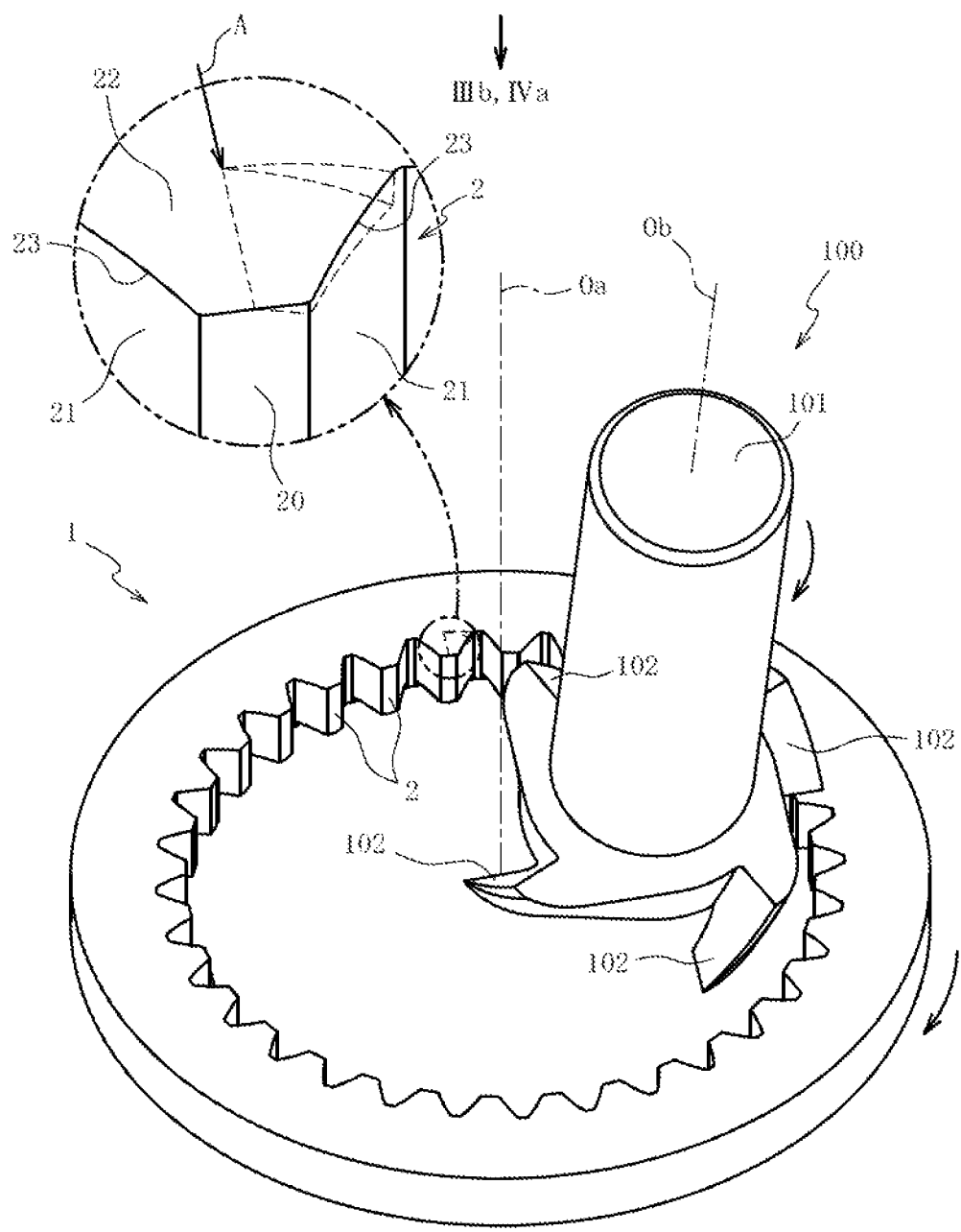
FIG. 1 is a perspective view of a toothed gear and a tool in a method for chamfering toothed gears according to an embodiment of the present invention.
Figure 2A:
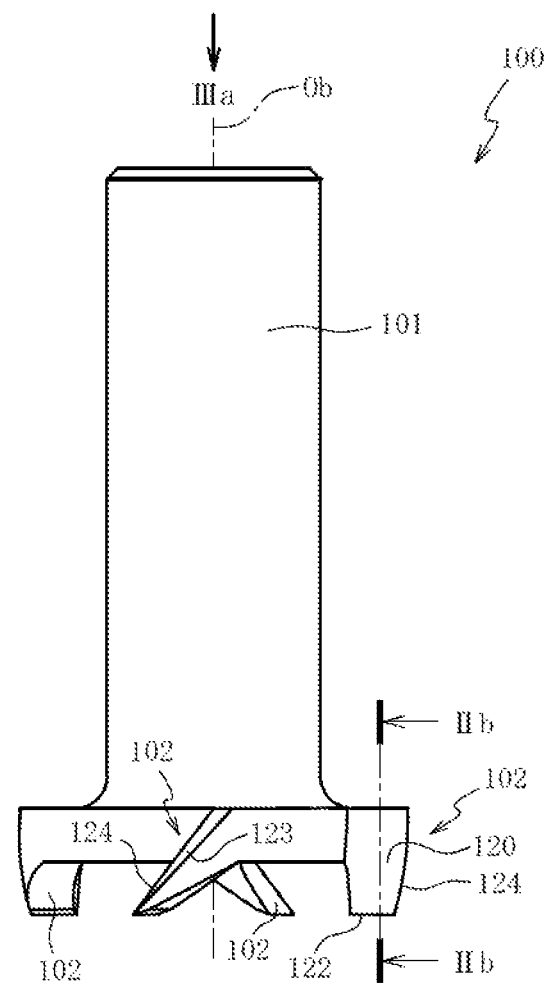
FIG. 2(a) is a front view of a tool and FIG. 2(b) is a partially enlarged sectional view of the tool taken along line IIb-IIb in FIG. 2(a)
Figure 2B:
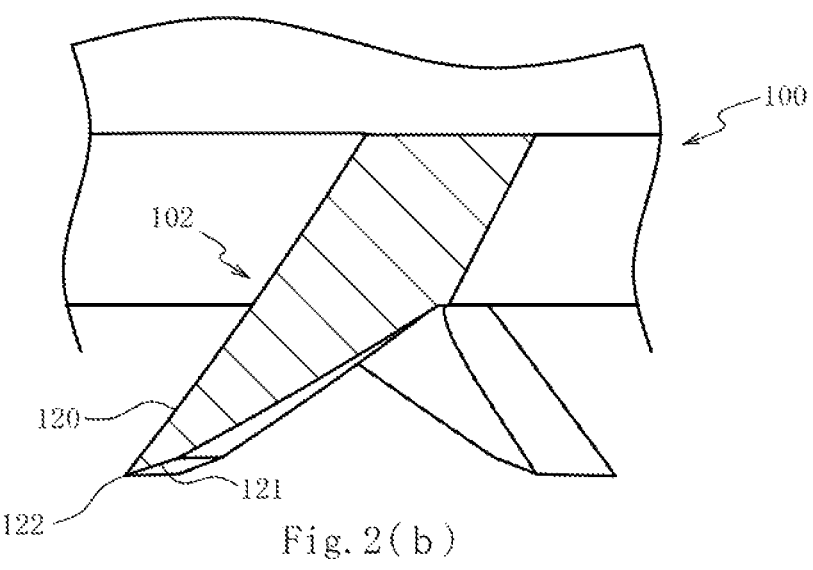
Figure 3A:
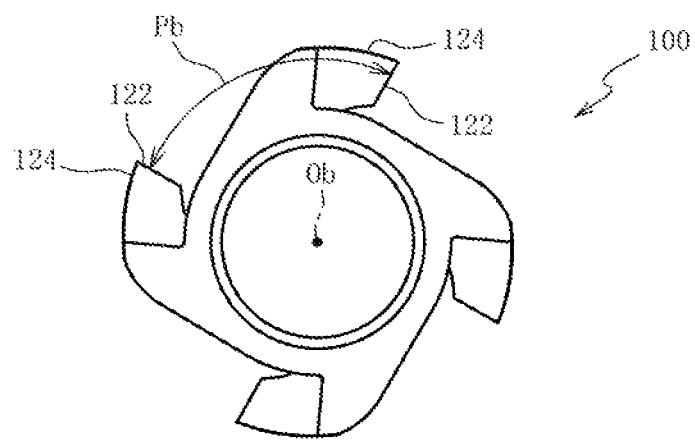
FIG. 3(a) is a top view of the tool in FIG. 2(a) as viewed from the direction of arrow IIIa and FIG. 3(b) is a top view of the toothed gear in FIG. 1 as viewed from the direction of arrow IIIb.
Figure 3B:
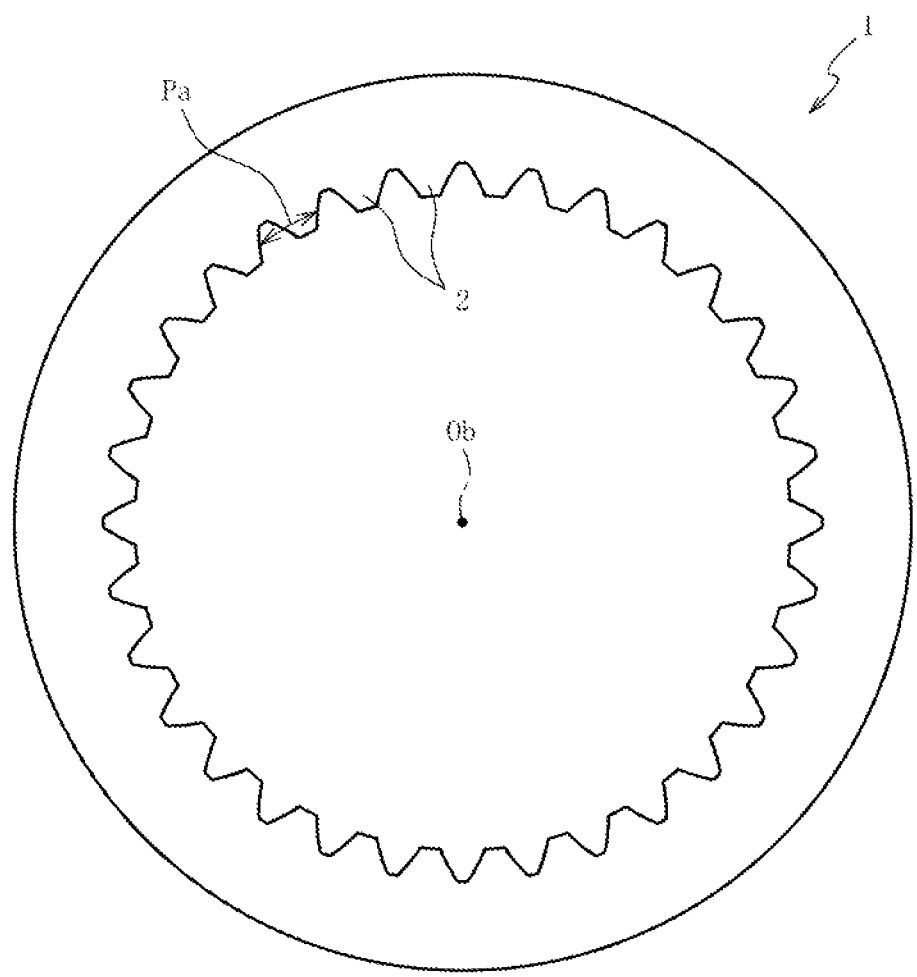

FIG. 1 is a perspective view of a toothed gear 1 and a tool 100 illustrating a method for chamfering the toothed gear 1 according to an embodiment of the present invention. FIG. 2(a) is a front view of the tool 100 and FIG. 2(b) is a partially enlarged sectional view of the tool 100 taken along line IIb-IIb of FIG. 2(a). FIG. 3(a) is a top view of the tool 100 in FIG. 2(a) as viewed from the direction of arrow IIIa and FIG. 3(b) is a top (side) view of the toothed gear 1 in FIG. 1 as viewed from the direction of arrow IIIb.

As shown in FIG. 1, the toothed gear 1 to which the chamfering method according to the present embodiment is applied is an annulus gear in which a plurality (32 in the present embodiment) of teeth 2 protrude toward the axis Oa of the toothed gear 1. The teeth 2 are provided at equal intervals around the axis Oa of the toothed gear 1.

As shown in the enlarged part of FIG. 1, in each tooth 2, a face formed in a protruded tip portion of the tooth is a tooth crest 20; a pair of faces (flanks) continuing to the tooth crest 20 in the direction around the axis Oa are tooth flanks 21; a face (side face) continuing to each of the tooth crest 20 and the tooth flanks 21 and formed at an end portion of the tooth 2 in a tooth trace direction (axis Oa direction) is an end face 22.

The teeth 2 of such a toothed gear 1 are formed by a gear cutting apparatus or rolling apparatus, not shown (toothed gear formation step), and after the formation of the teeth 2, chamfering is performed with the tool 100 (chamfering step). In the present embodiment, mainly a line intersection portion 23 between a tooth flank 21 and an end face 22 of a tooth 2 is chamfered by the tool 100. The chamfering position (start point of chamfering) A for the chamfering is substantially at the center of the end face 22 in the circumferential direction around the axis Oa and a wide area of the end face 22 (portion shown by a broken line in the enlarged part of FIG. 1) is chamfered.

The tool 100 chamfering the teeth 2 is an end mill including: a columnar shank 101 having the axis Ob at the center of the shank; and a cutting part 102 formed at an end portion of the shank 101 in the axis Ob direction. The shank 101 is a port held by such a machine tool (not shown) as a compound working machine. Driving force rotating the tool 100 around the axis Ob of the shank 101 is transmitted from the machine tool and a line intersection portion 23 or a tooth 2 is chamfered with the cutting part 102 by the rotation of the tool 100.

A plurality of (four in the present embodiment) cutting parts 102 are formed around the axis Ob of the shank 101 and the cutting parts 102 are arranged in a rotationally symmetrical (fourfold symmetrical) shape with respect to one another around the axis Ob.

As shown in FIGS. 2(a) and 2(b), the cutting parts 102 are so formed as to protrude from the circumferential surface of the shank 101 to the one end side (lower side in FIG. 2(a)) in the axis Ob direction. In each cutting part 102, a cutting face 120 facing to the forward side (left side in FIG. 2(b)) of the direction of rotation of the tool 100 is formed.

In the line intersection portion between a cutting face 120 and an end flank 121 (refer to FIG. 2(b)), an end cutting edge 122 extending in the radial direction is formed. In the line intersection portion between a cutting face 120 and a peripheral flank 123 (refer to FIG. 2(a)), a peripheral cutting edge 124 extending in the axis Ob direction is formed A line intersection portion 23 (refer to the enlarged part of FIG. 1) of a tooth 2 is chamfered by the end cutting edge 122 and the peripheral cutting edge 124.

As shown in FIGS. 3(a) and 3(b), the diameter of the tool 100 (diameter of a circle running through the outer circumferential end of each end cutting edge 122) is so formed as to be smaller than the inside diameter of the toothed gear 1 (diameter of the inscribed circle of a tooth 2). A pitch Pb of the end cutting edges 122 (peripheral cutting edges 124) of the tool 100 is so set as to be larger than (five times in the present embodiment) a pitch Pa of the teeth 2 of the toothed gear 1. Owing to a difference between the pitches Pa, Pb, a circumferential speed of the end cutting edges 122 can be made faster than a circumferential speed of the teeth 2 when the teeth 2 are chamfered. A detailed description will be given to this chamfering method with reference to FIGS. 4(a) and 4(b).

Figure 4A:
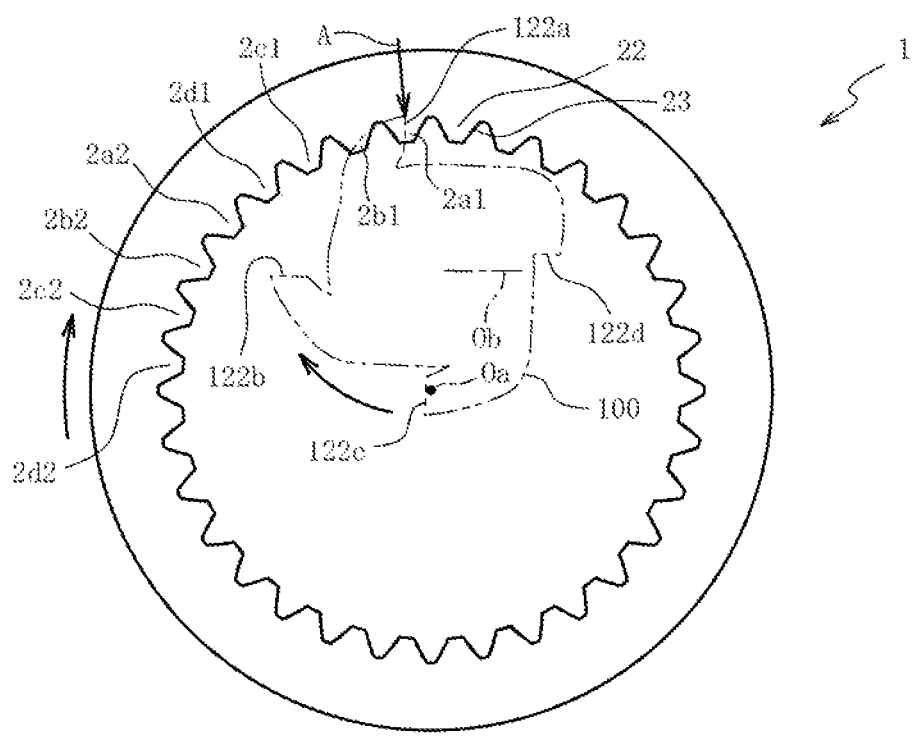
FIG. 4(a) is a top view of the toothed gear and the tool in FIG. 1 as viewed from the direction of arrow IVa and FIG. 4(b) is a top view of the toothed gear and the tool, illustrating the toothed gear and the tool rotated from the state in FIG. 4(a)
Figure 4B:
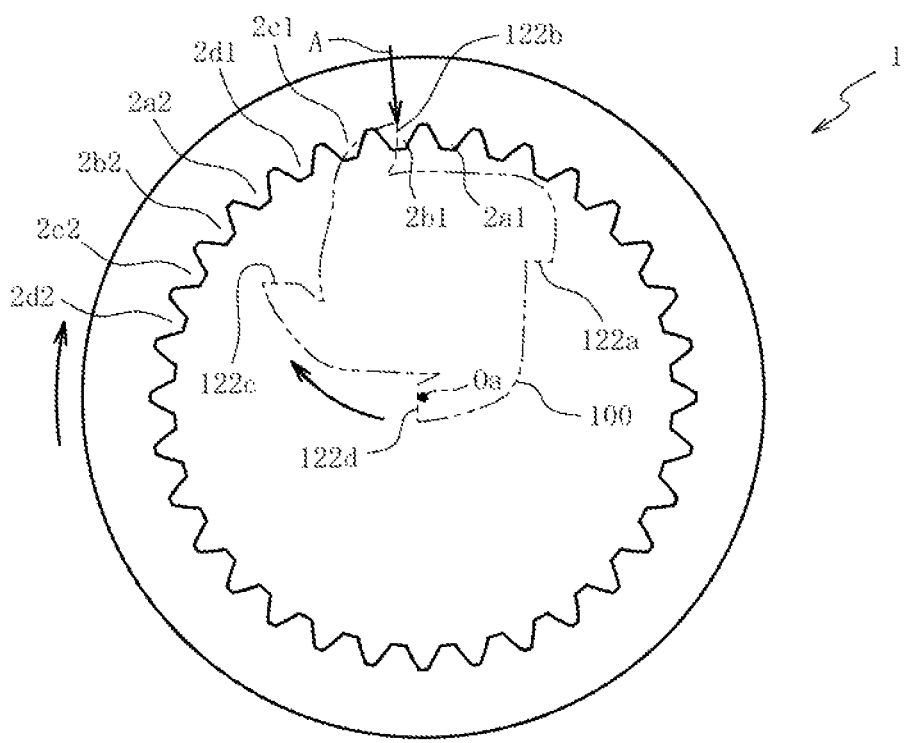

FIG. 4(a) is a top view of the toothed gear 1 and the tool 100 in FIG. 1 as viewed from the direction of arrow IVa and FIG. 4(b) is a top view of the toothed gear 1 and the tool 100, illustrating a state in which the toothed gear 1 and the tool 100 have been rotated from the state shown in FIG. 4(a). In FIGS. 4(a) and 4(b), an outer shape of the tool 100 (cutting parts 102) is schematically shown by an alternate long and two short dashes line.

In the following description, the four end cutting edges 122 the tool. 100 will be marked with reference numerals in the order of rotation opposite the direction of rotation of the tool 100, like end cutting edge 122a, end cutting edge 122b, end cutting edge 122c, and end cutting edge 122d.

In the following description, a tooth chamfered first by the end cutting edge 122a. (in the first turn of the tool 100) is taken as tooth 2a1; a tooth chamfered secondly (in the second turn of the tool 100) is taken as tooth 2a2 . . . ; and teeth 2 chamfered by the end cutting edges. 122b to 122d are similarly taken as tooth 2b1, 2d1, tooth 2b2, 2c2, 2d2 . . . . However, when the end cutting edges 122a to 122d or the teeth 2a1, 2b1, 2c1, 2d1 . . . are not discriminated, an end cutting edge or a tooth will be referred to as end cutting edge 122 or tooth 2 in the following description.

As shown in FIGS. 4(a) and 4(b), at the chamfering step of chamfering the toothed gear 1, as mentioned above, the tool 100 is secured on a machine tool with the axis Ob of the tool 100 inclined from the axis Oa of the toothed gear 1 by a predetermined angle (15° in the present embodiment). When the toothed gear 1 and the tool 100 are rotated in an identical direction (clockwise in the example in FIGS. 4(a) and 4(b)) in this state, the toothed gear and the tool are rotated so that an end cutting edge 122 slantly cuts into the end face 22 of a tooth 2. As a result, the line intersection portion 23 between a tooth flank 21 positioned on the forward side in the direction of rotation of the tooth 2 and the end face 22 can be chamfered.

When such chamfering work is performed, in the present embodiment, a pitch of the end cutting edges 122 is set to five times a pitch of the teeth 2; therefore, a circumferential speed of the end cutting edges 122 is set to five times a circumferential speed of the teeth 2. As a result, after the tooth 2a1 is chamfered by the end cutting edge 122a, chamfering of the tooth 2b1 by the end cutting edge 122b is performed in the chamfering position A of the end cutting edge 122a (position where the end cutting edge 122a is brought into contact with an end face 22) (refer to FIG. 4(b)). Such chamfering of the teeth 2c1, 2d1 in the chamfering position A is similarly repeated by the end cutting edges 122c, 122d and adjoining teeth 2a1, 2b1, 2c1, 2d1, 2a2, 2b2, 2c2, 2d2 . . . are thereby continuously chamfered and all the 32 teeth 2 are eventually chamfered.

A more specific description will be given. By setting a pitch of the end cutting edges 122 to five times a pitch of the teeth 2 and continuously chamfering adjoining teeth 2, a circumferential speed of the end cutting edges 122 can be made equal to five times a circumferential speed of the teeth 2. As a result, a difference in circumferential speed between the end cutting edges 122 and the teeth 2 can be utilized in chamfering and thus a cutting resistance can be reduced during the chamfering. Consequently, a life of the tool 100 can be lengthened. Further, by reducing a cutting resistance during chamfering, chamfering with a large overall length of a chamfered portion (length of a line intersection portion 23) or chamfering with a large chamfering depth can be implemented.

When an arbitrary point in a contact portion between a tooth 2 and an end cutting edge 122 in the above-mentioned chamfering position A is taken as a contact point, an interval between teeth 2 around the axis Oa in a radial position of that contact point is a pitch Pa of the teeth 2 (refer to FIGS. 3(a) and 3(b)). An interval between end cutting edges 122 around the axis Ob in a radial position of such a contact point is a pitch Pb of the end cutting edges 122.

When the teeth 2 are to be sequentially chamfered with the end cutting edges 122, the end cutting edge 122b can interfere with the tooth 2a1, for example, after the tooth 2b1 is chamfered. This interference is prone to occur when a circumferential speed of the end cutting edges 122 is made faster than a circumferential speed of the teeth 2 as in the present embodiment (because the end cutting edge 122b becomes prone to be brought into contact with the tooth 2a1 before the tooth 2a1 escapes to the forward side in the direction of rotation).

To suppress this interference, a diameter of the tool 100 (turning radius of the end cutting edges 122) need be reduced to make it easier for a rotation trajectory of the end cutting edges 122 to escape from the teeth 2. Or, a circumferential speed of the end cutting edges 122 need be set to such a speed that interference with the teeth 2 is avoided.

In this case, a circumferential speed of the end cutting edges 122, that is, a pitch of the end cutting edges 122 is proportional to a diameter of the tool and inversely proportional to a number of the end cutting edges 122. Therefore, to suppress the above-mentioned interference between the end cutting edges 122 and the teeth 2 and further give a predetermined or higher circumferential speed to the end cutting edges 122, a diameter of the tool 100 or a number of the end cutting edges 122 need be adjusted.

However, a diameter of the tool 100 may be restricted by a shape of a chamfered surface, such as a length of a line intersection portion 23. In this case, a pitch of the end cutting edges 122 (circumferential speed of the end cutting edges 122) must be adjusted via a number of the end cutting edges 122. This causes a problem of a lowered degree of freedom in designing the tool 100. A description will be given to a chamfering method for solving this problem with reference to FIG. 5(a).

Figure 5A:
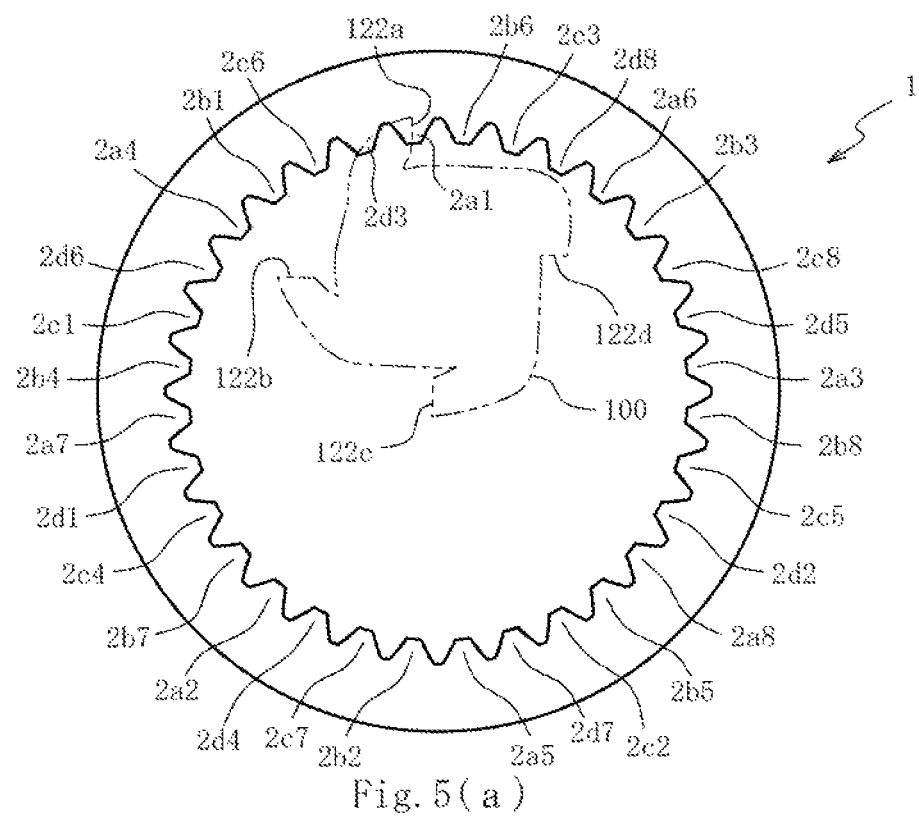
FIG. 5(a) is a top view of a toothed gear and a tool, illustrating a first modification to the chamfering method

FIG. 5(a) is a top view of the toothed gear 1 and the tool 100, illustrating a first modification to the chamfering method FIG. 5(a) is equivalent to a top view of the toothed gear 1 and the tool 100 in FIG. 1 as viewed form the direction of arrow IVa and in the FIG. 5(a), an outer shape of the tool 100 is schematically shown by an alternate long and two short dashes line.

As shown in FIG. 5(a), in the first modification to the chamfering method, the teeth 2 of the toothed gear 1 are sequentially chamfered every two teeth. When it is assumed that a multiplying factor of a pitch of the end cutting edges 122 relative to a pitch of the teeth 2 is M, to chamfer the teeth 2 every N teeth, a circumferential speed of the end cutting edges 122 only has to be set to M/(N+1) times a circumferential speed of the teeth 2. In the present embodiment, a pitch of the end cutting edges 122 of the tool 100 is set to five times (M=5) a pitch of the teeth 2. Therefore, to chamfer the teeth 2 every two teeth (N=2), a circumferential speed of the end cutting edges 122 is set to 5/3 times (M/(N+1) times) a circumferential speed of the teeth 2.

As a result, chamfering is performed in the order of the tooth 2a1, 2b1, 2c1, 2d1, 2a2, 2b2, 2c2, 2d2, . . . 2a8, 2b8, 2c8, 2d8 by the end cutting edges 122a to 122d and all the teeth 2 can be chamfered. By chamfering the teeth 2 every N teeth as mentioned above, a circumferential speed of the end cutting edges 122 can be made equal to 1/(N+1) (⅓ in the example in FIG. 5(a)) unlike cases where adjoining teeth 2 are continuously chamfered. That is, when a circumferential speed of the end cutting edges 122 is adjusted to such a level that interference between the end cutting edges 122 and the teeth 2 can be suppressed, a circumferential speed of the end cutting edges 122 can be adjusted by varying a value of N, instead of varying a number of the end cutting edges 122; therefore, a degree of freedom in designing the tool 100 is enhanced.

To chamfer all the teeth 2 chamfering the teeth 2 every N teeth as mentioned above, a value of N only has to be so set that a value of N+1 and a total number Na of the teeth 2 are relatively prime to each other. For example, when a total number Na of the teeth 2 is 32 as in the present embodiment, the teeth 2 are chamfered so that a value of N+1 is 3, 5, 7, 9, 13 . . . , that is, every two, foil six, eight . . . teeth. Thus, all the teeth 2 can be chamfered by rotating the tool 100 by a predetermined number of times.

However, when a multiplying factor of a pitch Pb of the end cutting edges 122 relative to a pitch Pa of the teeth 2 is five (M=5) as in the present embodiment, a circumferential speed of the end cutting edges 122 and a circumferential speed of the teeth 2 are caused to agree with each other by chamfering the teeth 2 every four teeth (N=4). That is, when a relation of M−1=N (M=N+1) is established, a circumferential speed of the end cutting edges 122 and a circumferential speed of the teeth 2 become identical with each other. For this reason, to increase a value of N, a multiplying factor M of the pitch also only has to be so increased as to satisfy a relation of "M−1>N(M>N+1)." As a result, a circumferential speed of the end cutting edges 122 can be made faster than a circumferential speed of the teeth 2 and thus a life of the tool 100 can be lengthened.

As mentioned above, a state in which all the teeth 2 have been chamfered can be obtained by rotating the tool 100 by a predetermined number of times. A state in which the teeth 2 have been chamfered with some teeth skipped can also be obtained. A description will be given to this chamfering method with reference to FIG. 5(b), FIG. 6(a) and FIG. 6(b).

Figure 5B:
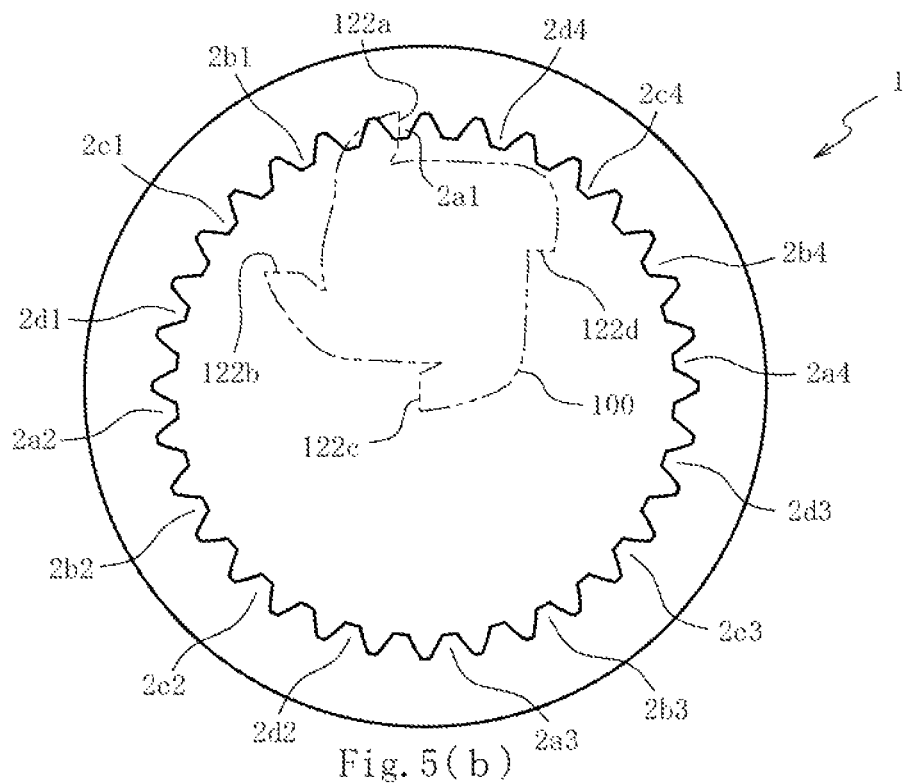
FIG. 5(b) is a top view of a toothed gear and a tool, illustrating a second modification to the chamfering method.
Figure 6A:
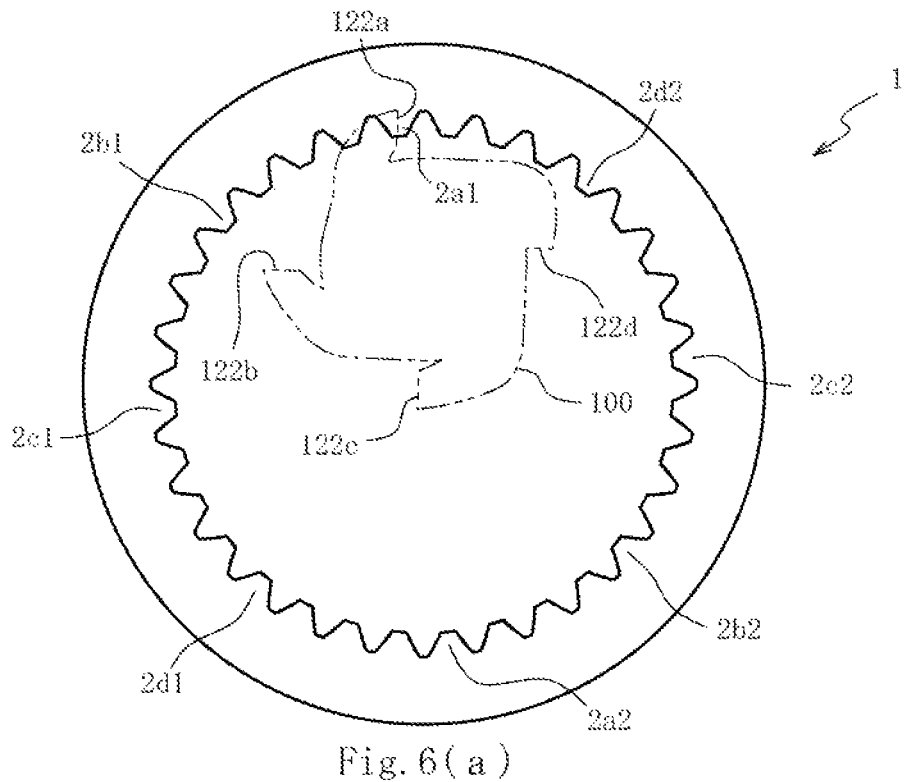
FIG. 6(a) is a top view of a toothed gear and a tool, illustrating a third modification to the chamfering method
Figure 6B:
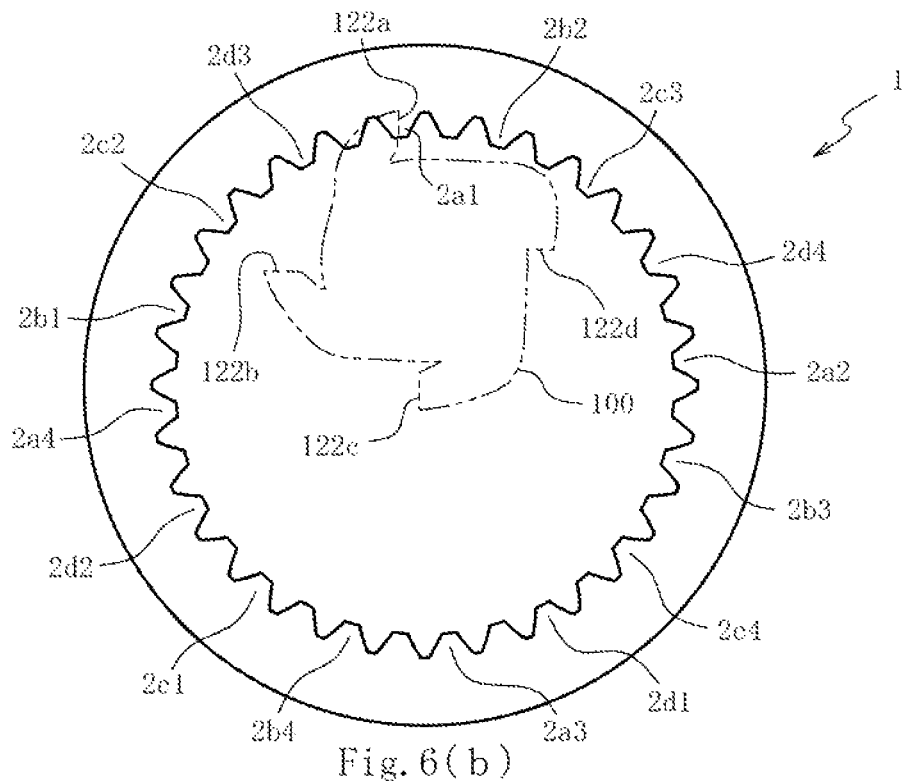
FIG. 6(b) is a top view of a toothed gear and a tool, illustrating a fourth modification to the chamfering method.

FIG. 5(b) is a top view of the toothed gear 1 and the tool 100, illustrating a second modification to the chamfering method; FIG. 6(a) is a top view of the toothed gear 1 and the tool 100, illustrating a third modification to the chamfering method; and FIG. 6(b) is a top view of the toothed gear 1 and the tool 100, illustrating a fourth modification to the chamfering method. FIG. 5(b), FIG. 6(a) and FIG. 6(b) are equivalent to top views of the toothed gear 1 and the tool 100 in FIG. 1 as viewed from the direction of arrow IVa and in FIG. 5(b), FIG. 6(a) and FIG. 6(b), an outer shape of the tool 100 is schematically shown by an alternate long and two short dashes line.

As shown in FIG. 5(b), in the second modification to the chamfering method, the teeth 2 of the toothed gear 1 are sequentially chamfered every other tooth. Since a pitch of the end cutting edges 122 is set to five times (M=5) a pitch of teeth 2 as mentioned above, to chamfer the teeth 2 every other tooth (N=1), a circumferential speed of the end cutting edges 122 is set to 5/2 times (M/(N+1) times) a circumferential speed of the teeth 2.

As a result, chamfering is performed in the order of the tooth 2a1, 2b1, 2c1, 2d1, 2a2, 2b2, 2c2, 2d2, . . . 2a4, 2b4, 2c4, 2d4 by the end cutting edges 122a to 122a. Even when the tool 100 is rotated by a predetermined or larger number of times (for example, five or more times), the end cutting edge 122a passes through the tooth 2a1 chamfered by the end cutting edge 122a again and a state in which the teeth 2 have been chamfered with one tooth skipped (every other tooth) is obtained. This is because a total number of the teeth 2 is 32 (Na=32) and the teeth 2 are chamfered every other tooth (N=1) and thus 2 as a value of N+1, is a divisor of Na.

As shown in FIG. 6(a), in the third modification to the chamfering method, the teeth 2 of the toothed gear 1 are sequentially chamfered every three teeth. Since a pitch of the end cutting edges 122 is set to five times (M=5) a pitch of the teeth 2 as mentioned above, to chamfer the teeth 2 every three teeth (N=3), a circumferential speed of the end cutting edges 122 is set to 5/4 times (M/(N+1) times) a circumferential speed of the teeth 2.

As a result, chamfering is performed in the order of the tooth 2a1, 2b1, 2c1, 2d1, 2a2, 2b2, 2c2, 2d2 by the end cutting edges 122a to 122d Also, in this case, a total number of teeth 2 is 32. (Na=32) and the teeth 2 are chamfered every three teeth. (N=1) and thus 4 as a value of N+1 is a divisor of Na. Therefore, even when the tool 100 is rotated by a predetermined OT larger number of times (for example, three or more times), a state in which the teeth have been chamfered with three teeth skipped can be obtained.

When the teeth 2 are chamfered every N teeth as in the second and third modifications shown in FIG. 5(b) and FIG. 6(a), a state in which the teeth 2 have been chamfered every N teeth can be obtained by making a value of N+1 equal to a divisor of Na. Therefore, only desired teeth 2 can be chamfered by appropriate setting a value of N.

As shown in FIG. 6(b), in the fourth modification to the chamfering method, the teeth 2 of the toothed gear 1 are sequentially chamfered every five teeth. As mentioned above, to make a circumferential speed of the end cutting edges 122 faster than a circumferential speed of the teeth 2, a relation of "M−1>N(M>N+1)" need be satisfied. Therefore, though in the fourth modification, a pitch of the end cutting edges 122 is set to seven times a pitch of the teeth 2, in FIG. 6(b), an outer shape of the tool 100 is shown to be the same as in FIG. 6(a) and the like.

In the fourth modification, as mentioned above, a pitch of the end cutting edges 122 is set to seven times (M=7) a pitch of the teeth 2. Therefore, to chamfer the teeth 2 every five teeth (N=5), a circumferential speed of the end cutting edges 122 is set to 7/6 times (M/(N+1) times) a circumferential speed of the teeth 2.

As a result, chamfering is performed in the order of the tooth 2a1, 2b1, 2c1, 2d1, 2a2, 2b2, 2c2, 2d2, 2a4, 2b4, 2c4, 2d4 by the end cutting edges 122a to 122d In this case, a total number of the teeth 2 is 32 (Na=32) and the teeth 2 are chamfered every five teeth (N=5); and 6 as a value of N+1 and 32 as a value of Na have two or more common divisors, "1" and "2." Also, in this configuration, a state in which the teeth 2 have been chamfered with one tooth skipped can be obtained by rotating the tool 100 by a predetermined number of times (for example, four times).

Though not shown in drawings, also when the teeth 2 are sequentially chamfered every nine teeth (N=9), for example, 10 as a value of N+1 and 32 as a value of Na similarly have two or more common divisors, "1" and "2." Therefore, a state in which the teeth 2 have been chamfered with one tooth skipped is established.

The teeth 2 are chamfered every N teeth (N≥1) according to the first to fourth modifications as mentioned above; therefore, a state in which only desired teeth 2 have been chamfered can be obtained by varying a value N. Since the teeth 2 are chamfered every N teeth (N≥1), circumferential speed of the end cutting edges 122 can be adjusted without varying a number of the end cutting edges 122 by varying a value of N. As a result, a degree of freedom in designing the tool 100 is enhanced.

A description will be given to a chamfering method in a second embodiment with reference to FIGS. 7(a) and 7(b). The same element as described in relation to the first embodiment will be marked with the same reference numeral and a description of the element will be omitted. FIG. 7(a) is a front view of a tool 200 used in the chamfering method according to the second embodiment and FIG. 7(b) is a top view of a tool 200 in FIG. 7(a) as viewed from the direction of arrow VIIb.

As shown in FIGS. 7(a) and 7(b), the tool 200 is configured as a toothed gear-like tool including: a disk-shaped disk portion 203 formed at an end portion in the axis Ob direction of a shank 101; and a cutting part 204 formed in the circumferential surface of the disk portion 203. A plurality of (12 in the present embodiment) cutting parts 204 are formed in the circumferential surface of the disk portion 203 and the cutting parts 204 are arranged in a rotationally symmetrical (12-fold symmetrical) shape around the axis Ob.

The cutting parts 204 are so formed as to protrude outward from the circumferential surface of the disk portion 203 in the radial direction and the cutting parts 204 are formed so that the cross-sectional shape obtained by cutting a cutting part in a cylindrical surface around the axis Ob is trapezoidal. In each cutting part 204, a first cutting face 240a facing to the forward side of the direction of rotation of the tool 200 and a second cutting face 240b facing to the backward side of the direction of rotation of the tool 200 are formed.

The bottom face of a cutting part 204 is a flat surface orthogonal to the axis Ob and a first end cutting edge 241a and a second end cutting edge 241b are formed in the line intersection portions between this bottom face of the cutting part 204 and the first cutting face 240a and the second cutting face 240b. A first peripheral cutting edge 242a and a second peripheral cutting edge 242b are formed in the line intersex ion portions between the circumferential surface of the cutting part 204 and the first cutting face 240a and the second cutting face 240b.

The diameter of the tool 200 (diameter of a circle running through the outer circumferential end of each of the first end cutting edge 241a and the second end cutting edge 241b) is so set as to be smaller than the inside diameter of the toothed gear 1 (refer to FIGS. 3(a) and 3(b)). A pitch Pc of the first end cutting edges 241a (first peripheral cutting edges 242a) of the cutting parts 204 and a pitch Pc of the second end cutting edges 241b (second peripheral cutting edges 242b) are respectively set to 2.5 times a pitch Pa of the teeth 2 (refer to FIGS. 3(a) and 3(b).

Figure 8A:
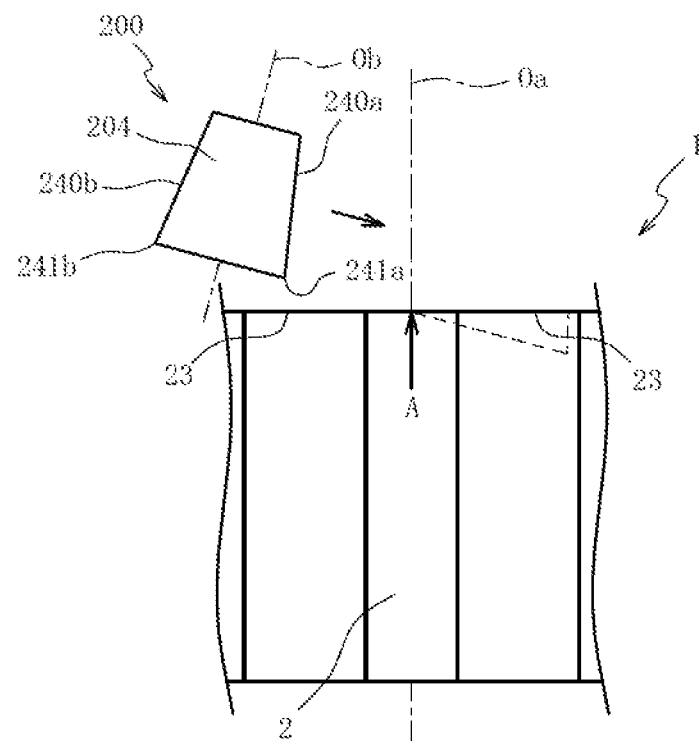
FIG. 8(a) is a schematic diagram illustrating how one line intersection portion of a tooth is chamfered and FIG. 8(b) is a schematic diagram illustrating how the other line intersection portion of the tooth is chamfered.
Figure 8B:
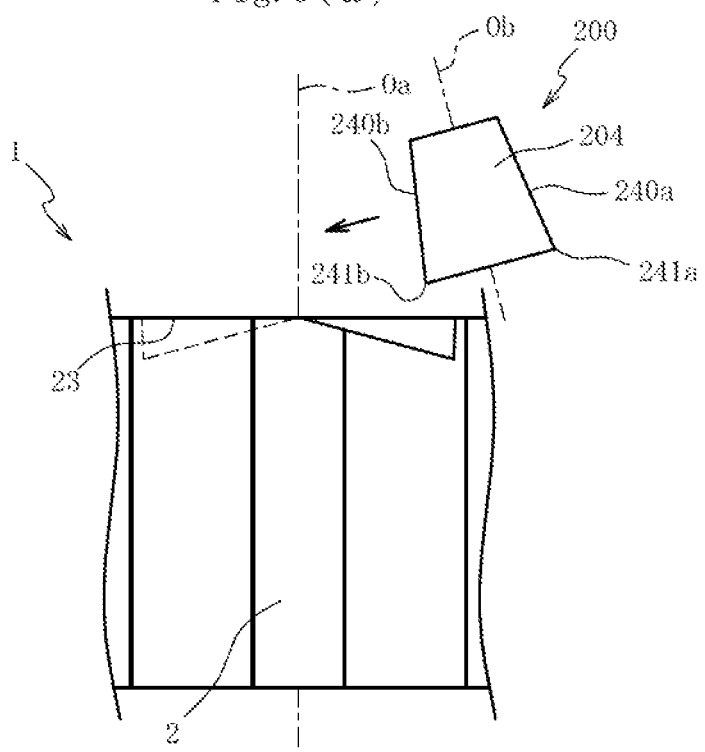

A description will be given to a method for chamfering the toothed gear 1 using the tool 200 with reference to FIGS. 8(a) and 8(b). FIG. 8(a) is a schematic diagram illustrating how one line intersection portion 23 of a tooth 2 is chamfered and FIG. 8(b) is a schematic diagram illustrating how the other line intersection portion 23 of the tooth 2 is chamfered. FIGS. 8(a) and 8(b) schematically show only one cutting part 204 of the tool 200.

As shown in FIGS. 8(a) and 8(b), at a chamfering step of chamfering the teeth 2 of the toothed gear 1 with the tool 200, a first process for chamfering a line intersection portion 23 positioned on the right side in the direction of rotation of the teeth 2 (crosswise direction in FIGS. 8(a) and 8(b)) and a second process for chamfering a line intersection portion 23 positioned on the left side are sequentially performed.

In the first process, the tool 200 is secured on a machine tool with the axis Ob of the tool inclined from the axis Oa of the toothed gear 1 by a predetermined angle (15° in the present embodiment). The toothed gear 1 and the tool 200 are rotated in an identical direction (rightward in the example in FIG. 8(a)) in this state. As a result, of the pair of the line intersection portions 23 of the tooth 2, the line intersection portion 23 positioned on one side (right side in FIGS. 8(a) and 8(b)) can be chamfered with the first end cutting edge 241a.

In the second process, conversely to the first process, the axis Ob of the tool 200 is inclined to the opposite side, sandwiching in between a flat surface which is along the axis Oa of the toothed gear 1 and runs through a chamfering position A of the tooth 2 by the first end cutting edge 241a. An inclination angle of the tool 200 in the second process may be the same (15° in the present embodiment) as in the first process or may be different. The toothed gear 1 and the tool 200 is inversely rotated in the opposite direction (leftward in the example in FIG. 8(b)) to that in the first process. As a result, of the pair of the line intersection portions 23 of the tooth 2, the line intersection portion 23 positioned on the other side (left side in FIGS. 8(a) and 8(b)) can be chamfered with the second end cutting edge 241b.

According to the chamfering method in the present embodiment, as mentioned above, the tool 200 need net be changed when each of a pair of line intersection portions 23 formed in one tooth chamfered and thus a machining time, can be shortened.

Each first cutting face 240a and each second cutting face 240b are so set that their respective rake angles in the axis Ob direction and in the radial direction are identical and each cutting part 204 is so formed as to be in plane symmetry with respect to a flat surface along the axis Ob. Therefore, a load applied to the cutting parts 20A can be made even between when chamfering is performed with the first end cutting edges 241a and when chamfering is performed with the second end cutting edges 241b. Consequently, setting of strength of the cutting parts 204 is facilitated.

Though not shown in the drawings, in each of the first process and the second process, adjoining teeth 2 are continuously chamfered. A more specific description will be given. As mentioned above, a pitch of the first end cutting edges 241a and the second end cutting edges 241b is set to 2.5 times (M=2.5) a pitch of the teeth 2. In each of the first process and the second process, a circumferential speed of the first end cutting edges 241a and the second end cutting edges 241b is set to 2.5 times a circumferential speed of the teeth 2. For this reason, as in the first embodiment, cutting resistance can be reduced during chamfering. Consequently, a lite of the tool 200 can be lengthened.

Up to this point, a description has been given to the present invention bases on the above-mentioned embodiments. However, the present invention is not limited to the above-mentioned embodiments at all and it is easily understood that the present invention can be various modified or improved without departing from the scope of the present invention.

In the description of each of the above embodiments, a case where the toothed gear 1 is an annulus gear comprised of 32 teeth 2 is taken as an example but the present invention is not limited to this. The chamfering method in each of the above embodiments is also applicable to, for example, a case where the toothed gear 1 is any other type of a toothed gear, such as an external toothed gear, or a case where a number of the teeth 2 is less than 32 or 33 or above.

In the description of each of the above embodiments, a case where a number of the end cutting edges 122 of the tool 100 is four or a number of the first end cutting edges 241a and the second end cutting edges 241b of the tool 200 is 12 is taken as an example but the present invention is not limited to this. Needless to add, a number of the end cutting edges 122 of the tool 100 or a number of the first end cutting edges 241a and the second end cutting edges 241b can be appropriately set to adjust a pitch (circumferential speed) of the cutting edges.

In the description of each of the above embodiments, a case where only the line intersection portions 23 positioned on one side in the tooth trace direction (axis Oa direction) of the teeth 2 are chamfered is taken as an example but the present invention is not limited to this. For example, the present invention may be so configured as to chamfer the line intersection portions 23 on both side in the tooth trace direction of the teeth 2.

In the description of the first embodiment, a case where of a pair of line intersection portions 23 formed in each tooth 2, only one line intersection portion 23 chamfered is taken as an example but the present invention is not limited to this. For example, the present invention may be so configured as to chamfer each of a pair of line intersection portions 23 formed in each tooth 2. In this case, a tool having a cutting face facing to the opposite side to the cutting face 120 around the axis Ob of the tool 100 only has to be used and chamfering only has to be performed by the same method as in the second embodiment.

In the description of the second embodiment, a case where adjoining teeth 2 are continuously chamfered with the tool 200 is taken as an example but the present invention is not limited to this. For example, the present invention may be so configured as to chamfer the teeth 2 every N teeth with the tool 200 as in the second to fourth modifications to the chamfering method described in relation to the first embodiment.

The invention claimed is:

1. A method for chamfering a toothed gear, the method comprising:
   a toothed gear formation step of forming a plurality of teeth around an axis of the toothed gear; and
   a chamfering step of sequentially chamfering, with a tool, the teeth formed by the toothed gear formation step, the tool including a plurality of end cutting edges formed at an end portion in an axis direction of an axis of the tool and formed around the axis of the tool,
   in which method for chamfering the toothed gear, at the chamfering step, the axis of the tool is inclined from the axis of the toothed gear and the toothed gear and the tool are rotated and line intersection portions, between: (i) tooth flanks positioned on a forward side in a direction of rotation of the toothed gear among tooth flanks of the teeth, and (ii) end faces of the teeth in a tooth trace direction that extends in the direction of the axis of the toothed gear, are thereby sequentially chamfered with the end cutting edges,
   wherein a pitch of the end cutting edges is set to M times a pitch of the teeth, and
   wherein at the chamfering step, a circumferential speed of the end cutting edges is made faster than a circumferential speed of the teeth to chamfer the line intersection portions;

the teeth are chamfered every N teeth; and values of M and N satisfy a relation of M>1, and a relation of M−1>N≥1.

2. The method for chamfering according to claim 1, wherein when a total number of the teeth is taken as Na, a value of N+1 and Na are prime numbers relative to each other.

3. The method for chamfering according to claim 2, wherein at the chamfering step, a circumferential speed of the end cutting edges is made equal to M/(N+1) times a circumferential speed of the teeth to chamfer the line intersection portions.

4. The method for chamfering according to claim 2,
wherein the plurality of end cutting edges include: a first end cutting edge formed in a first cutting face, wherein the first cutting face faces to one side in a direction of rotation of the tool; and a second end cutting edge formed in a second cutting face, wherein the second cutting face faces to the other side in the direction of rotation of the tool, and
wherein the chamfering step includes: a first process for chamfering, with the first end cutting edge, ones of the line intersection portions that are between: (i) ones of the tooth flanks facing to one side in the direction of rotation of the toothed gear and (ii) the end faces;
and a second process for, after the first process, inverting the rotations of the toothed gear and the tool and chamfering, with the second end cutting edge, ones of the line intersection portions that are between: (i) ones of the tooth flanks facing to the other side with respect to the direction, from the first process for chamfering, of rotation of the toothed gear and (ii) the end faces.

5. The method for chamfering according to claim 1, wherein when a total number of the teeth is taken as Na, a value N+1 and Na have two or more common divisors.

6. The method for chamfering according to claim 5, wherein a value of N+1 is a divisor of Na.

7. The method for chamfering according to claim 6, wherein at the chamfering step, a circumferential speed of the end cutting edges is made equal to M/(N+1) times a circumferential speed of the teeth to chamfer the line intersection portions.

8. The method for chamfering according to claim 6,
wherein the plurality of end cutting edges include: a first end cutting edge formed in a first cutting face, wherein the first cutting face faces to one side in a direction of rotation of the tool; and a second end cutting edge formed in a second cutting face, wherein the second cutting face faces to the other side in the direction of rotation of the tool, and
wherein the chamfering step includes: a first process for chamfering, with the first end cutting edge, ones of the line intersection portions that are between: (i) ones of the tooth flanks facing to one side in the direction of rotation of the toothed gear and (ii) the end faces;
and a second process for, after the first process, inverting the rotations of the toothed gear and the tool and chamfering, with the second end cutting edge, ones of the line intersection portions that are between: (i) ones of the tooth flanks facing to the other side with respect to the direction, from the first process for chamfering, of rotation of the toothed gear and (ii) the end faces.

9. The method for chamfering according to claim 5, wherein at the chamfering step, a circumferential speed of the end cutting edges is made equal to M/(N+1) times a circumferential speed of the teeth to chamfer the line intersection portions.

10. The method for chamfering according to claim 5,
wherein the plurality of end cutting edges include: a first end cutting edge formed in a first cutting face, wherein the first cutting face faces to one side in a direction of rotation of the tool; and a second end cutting edge formed in a second cutting face, wherein the second cutting face faces to the other side in the direction of rotation of the tool, and
wherein the chamfering step includes: a first process for chamfering, with the first end cutting edge, ones of the line intersection portions that are between: (i) ones of the tooth flanks facing to one side in the direction of rotation of the toothed gear and (ii) the end faces;
and a second process for, after the first process, inverting the rotations of the toothed gear and the tool and chamfering, with the second end cutting edge, ones of the line intersection portions that are between: (i) ones of the tooth flanks facing to the other side with respect to the direction, from the first process for chamfering, of rotation of the toothed gear and (ii) the end faces.

11. The method for chamfering according to claim 1, wherein at the chamfering step, a circumferential speed of the end cutting edges is made equal to M/(N+1) times a circumferential speed of the teeth to chamfer the line intersection portions.

12. The method for chamfering according to claim 11,
wherein the plurality of end cutting edges include: a first end cutting edge formed in a first cutting face, wherein the first cutting face faces to one side in a direction of rotation of the tool; and a second end cutting edge formed in a second cutting face, wherein the second cutting face faces to the other side in the direction of rotation of the tool, and
wherein the chamfering step includes: a first process for chamfering, with the first end cutting edge, ones of the line intersection portions that are between: (i) ones of the tooth flanks facing to one side in the direction of rotation of the toothed gear and (ii) the end faces;
and a second process for, after the first process, inverting the rotations of the toothed gear and the tool and chamfering, with the second end cutting edge, ones of the line intersection portions that are between: (i) ones of the tooth flanks facing to the other side with respect to the direction, from the first process for chamfering, of rotation of the toothed gear and (ii) the end faces.

13. The method for chamfering according to claim 1,
wherein the plurality of end cutting edges include: a first end cutting edge formed in a first cutting face, wherein the first cutting face faces to one side in a direction of rotation of the tool; and a second end cutting edge formed in a second cutting face, wherein the second cutting face faces to the other side in the direction of rotation of the tool, and
wherein the chamfering step includes: a first process for chamfering, with the first end cutting edge, ones of the line intersection portions that are between: (i) ones of the tooth flanks facing to one side in the direction of rotation of the toothed gear and (ii) the end faces;
and a second process for, after the first process, inverting the rotations of the toothed gear and the tool and chamfering, with the second end cutting edge, ones of the line intersection portions that are between: (i) ones of the tooth flanks facing to the other side with respect to the direction, from the first process for chamfering, of rotation of the toothed gear and (ii) the end faces.

14. The method for chamfering according to claim 13,
wherein the tool includes a cutting part in which the first end cutting edge and the second end cutting edge are formed,
wherein the tool includes at least one additional cutting part; and
wherein the cutting parts are arranged in plane symmetry with respect to a flat surface along the axis of the tool.

* * * * *